(12) United States Patent
Sugawara

(10) Patent No.: US 6,718,138 B1
(45) Date of Patent: Apr. 6, 2004

(54) DIGITAL-SIGNAL QUALITY MONITORING METHOD AND COMMUNICATIONS APPARATUS USING THIS METHOD

(75) Inventor: Mitsuru Sugawara, Sagamihara (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 578 days.

(21) Appl. No.: 09/593,077

(22) Filed: Jun. 13, 2000

(30) Foreign Application Priority Data

Jun. 14, 1999 (JP) ............................................. 11-167550

(51) Int. Cl.[7] ............................................. H04B 10/08
(52) U.S. Cl. ............................. 398/9; 398/26; 398/27; 398/29; 398/33; 398/141; 398/147; 398/79; 398/202; 398/214; 375/224; 375/317
(58) Field of Search ................................. 398/9, 26, 27, 398/29, 33, 141, 147, 79, 202, 214; 375/224, 317

(56) References Cited

U.S. PATENT DOCUMENTS

| 5,333,147 | A | | 7/1994 | Nohara et al. | |
|---|---|---|---|---|---|
| 5,920,414 | A | * | 7/1999 | Miyachi et al. | 359/133 |
| 6,055,078 | A | * | 4/2000 | Chen et al. | 359/130 |
| 6,320,687 | B1 | * | 11/2001 | Ishikawa | 359/161 |

FOREIGN PATENT DOCUMENTS

| EP | 0 999 670 | 5/2000 |
|---|---|---|
| JP | 10-10176 | 1/1998 |
| JP | 10-206469 | 8/1998 |
| WO | WO 00/60800 | 10/2000 |

OTHER PUBLICATIONS

Neal S. Bergano et al., "Margin Measurements in Optical Amplifier Systems", IEEE Photonics Technology Letters, vol. 5, No. 3, Mar. 1993, pp. 304–306.

K. Mueller et al., "Application of Amplitude Histograms for Quality of Service Measurements of Optical Channels and Fault Identification", European Conference on Optical Communication ' 98, Sep. 20–24, 1998, pp. 707–708.

* cited by examiner

Primary Examiner—Leslie Pascal
Assistant Examiner—Hanh Phan
(74) Attorney, Agent, or Firm—Oblon, Spivak, McClelland, Maier & Neustadt, P.C.

(57) ABSTRACT

While a discrimination level is scanned by a discrimination section, an average-value detecting section detects the average value of the discrimination output. This yields a distribution function of an input signal. Further, a differentiation section performs a differential process to acquire a probability density function. Average values or dispersion values of, for example, the mark level and space level of the input signal are computed from the distribution function and the probability density function. Accordingly, a Q value as a quality parameter can be obtained.

19 Claims, 9 Drawing Sheets

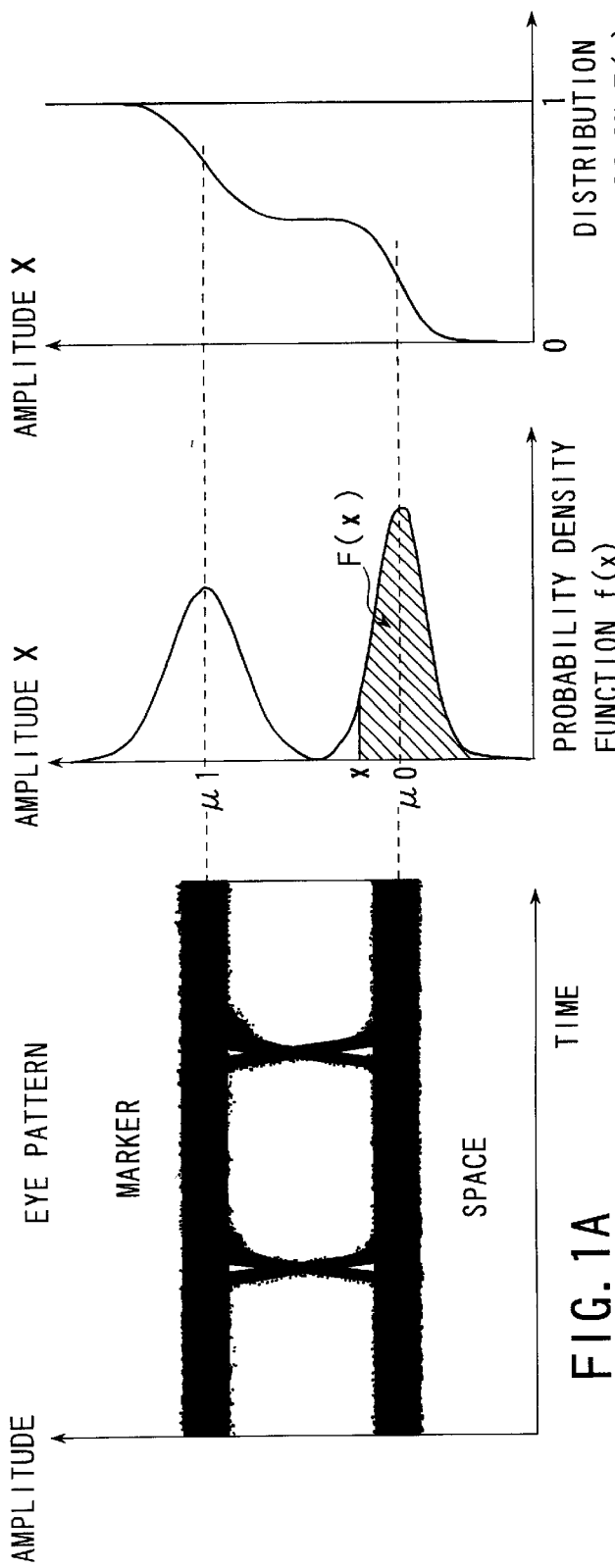
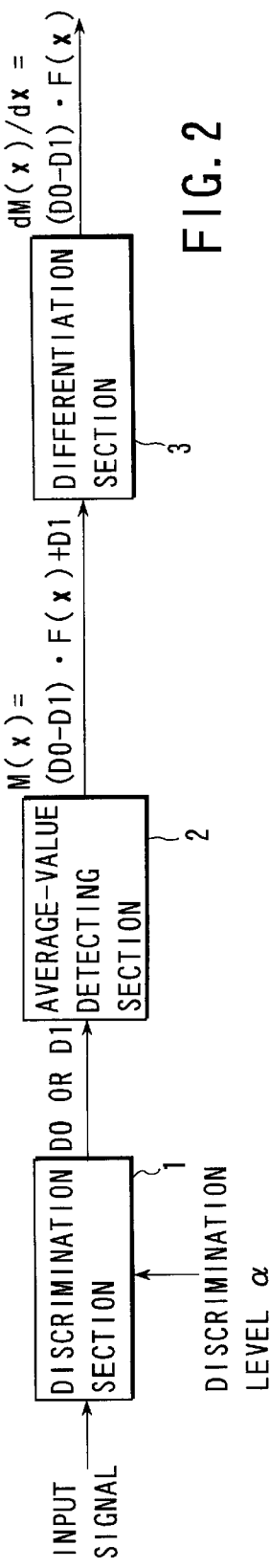

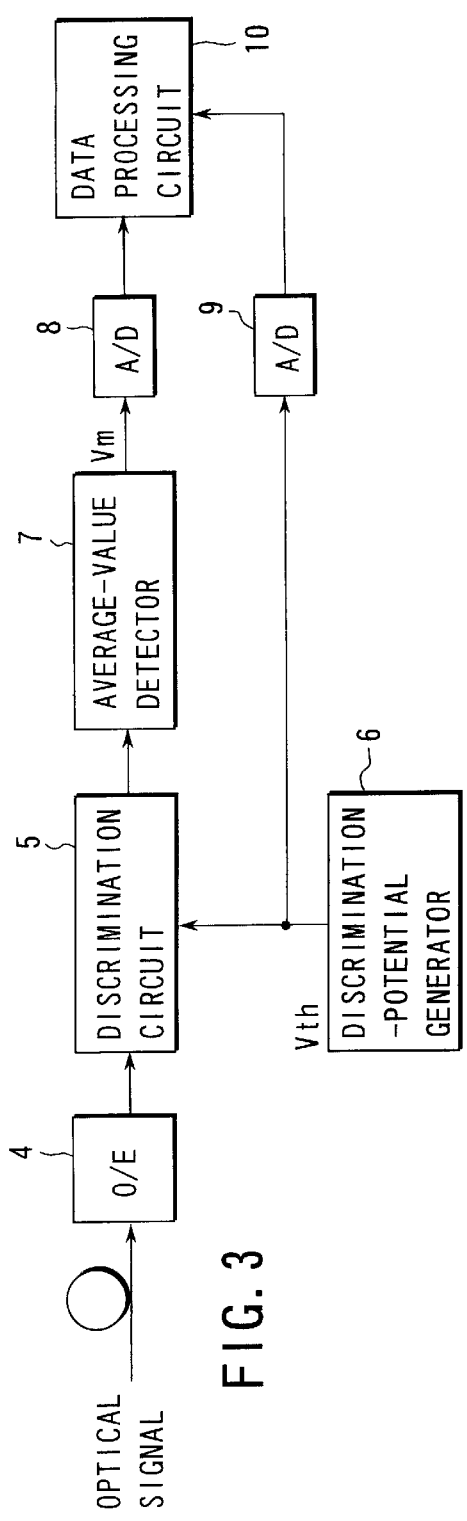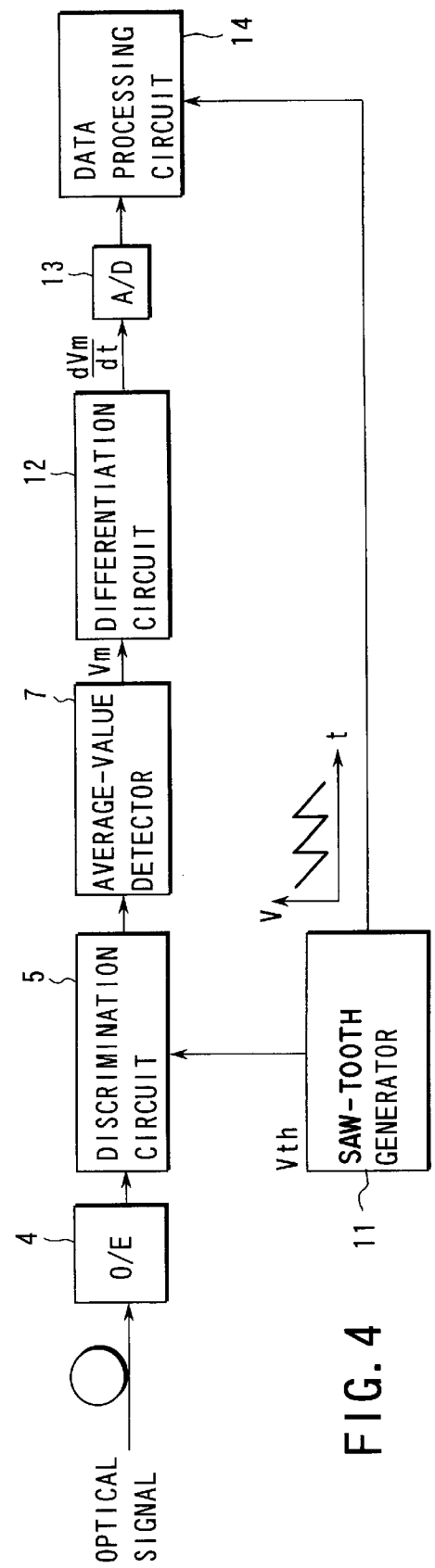
FIG. 3
FIG. 4

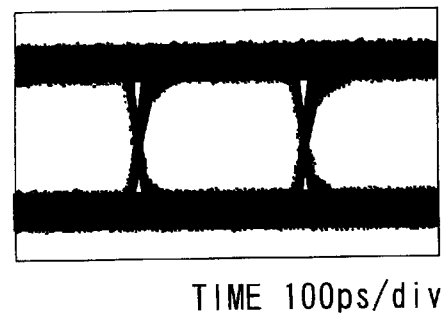 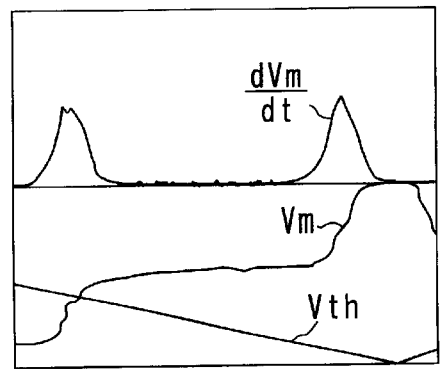
TIME 100ps/div
FIG. 5A
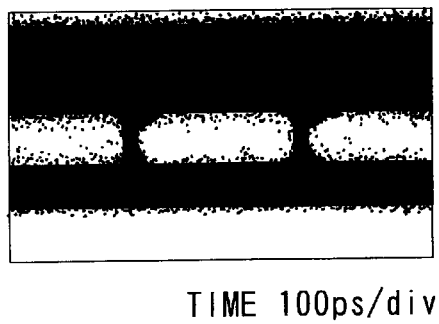 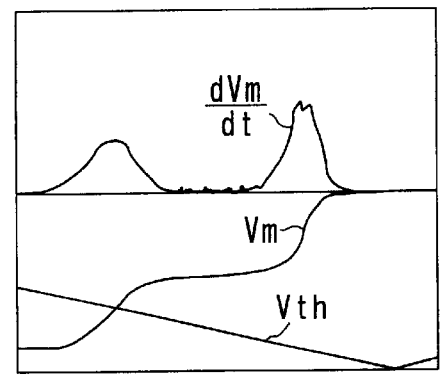
TIME 100ps/div
FIG. 5B
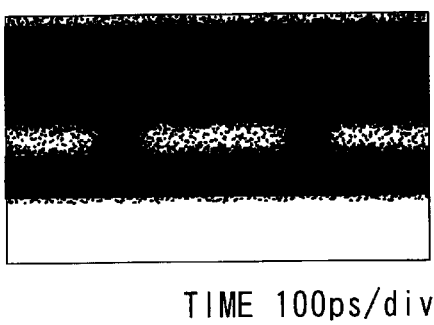 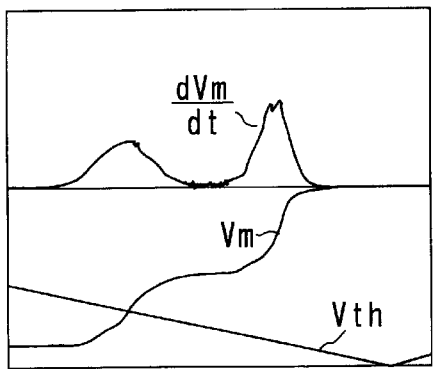
TIME 100ps/div
FIG. 5C

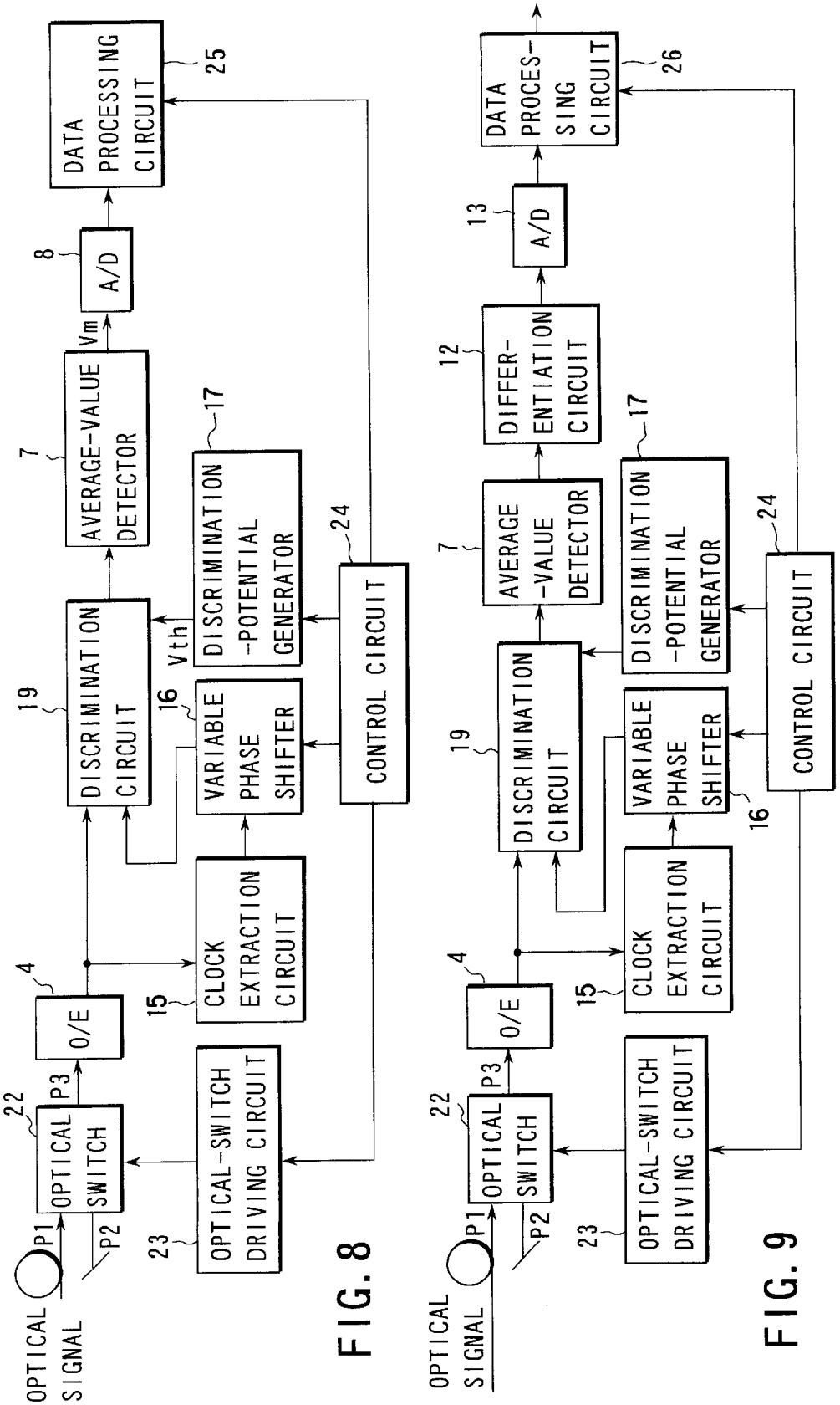

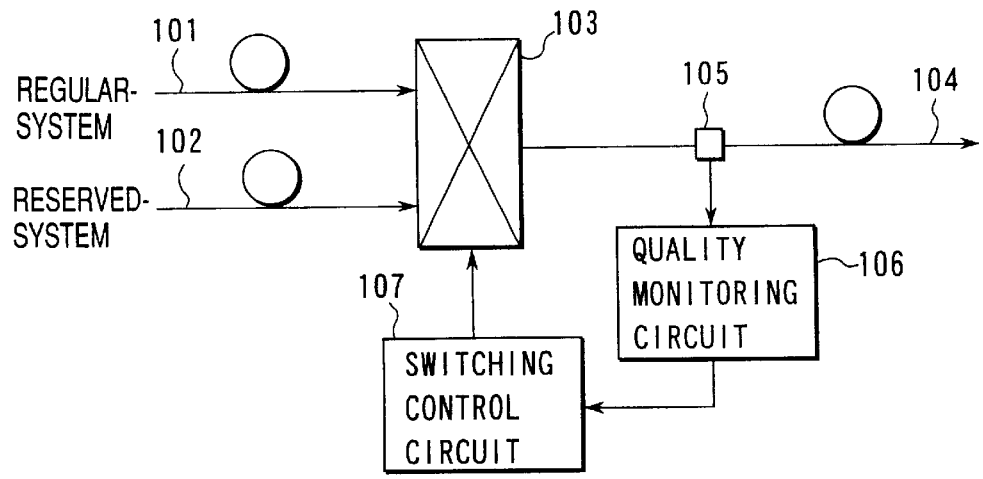
F I G. 10
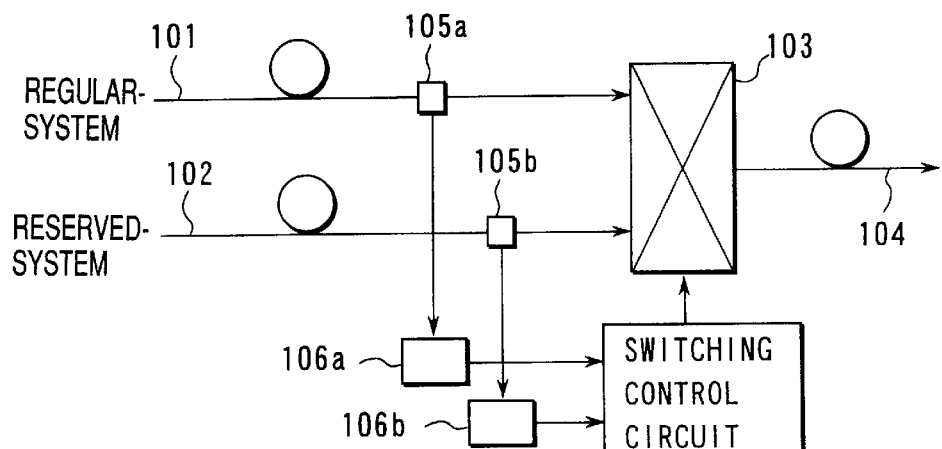
F I G. 11

DIGITAL-SIGNAL QUALITY MONITORING METHOD AND COMMUNICATIONS APPARATUS USING THIS METHOD

CROSS-REFERENCE TO RELATED APPLICATIONS

This application is based upon and claims the benefit of priority from the prior Japanese Patent Application No. 11-167550, filed Jun. 14, 1999, the entire contents of which are incorporated herein by reference.

BACKGROUND OF THE INVENTION

The present invention relates to a digital-signal quality monitoring method which is used in a digital transmission system such as an optical transmission system and can easily monitor the quality of transmission signals; and a communications apparatus which uses this method.

In the field of recent digital transmission systems, as improvements are being made on the wave-length multiplexing technology and optical switching technology, there is an expectation for realization of large-capacity and highly-flexible optical networks. A great attention is paid particularly to a WDM (Wavelength Division Multiplexing) network which is characterized by its capability of employing different transmission speeds, transmission frame formats and modulation systems for different wavelength channels.

This type of network needs such control as to always monitor the quality of signals to transfer in an optical fiber and switch that optical fiber to a redundant system when some failure occurs in the optical fiber. Possible factors for the degradation of the quality of signals in an optical fiber are the deterioration of the S/N ratio caused by an increase in spontaneous emission (ASE) noise that is generated in an optical amplifier, the deterioration of waveforms originated by the wavelength dispersion and the non-linear characteristic of a transmission fiber and crosstalk to another wavelength channel due to a variation in signal wavelength.

A Q value has often been used as a parameter for monitoring the quality of binary digital signals that travel through an optical fiber. The Q value is a parameter which represents the S/N ratio that is defined by the following equation.

$$Q = \frac{|\mu_1 - \mu_0|}{\sigma_1 + \sigma_0}$$

where $\mu_1$ and $\mu_0$ are arverage values of the mark level and space level respectively and $\sigma_1$ and $\sigma_0$ are dispersion values of the mark level and space level respectively.

Available methods for the acquisition of a Q value are a method of acquiring a Q value by measuring the reception error ratio while scanning a discrimination threshold value, as proposed in IEEE Photonics Tecnol. Lett., Vol. 5, No. 3, pp. 304–306, 1993, "Margin measurements in optical amplifier system" by N. S. Bargano et al., and a method of acquiring a Q value from the amplitude histogram of an eye pattern obtained by using the sampling technique, as proposed in ECOC '98, pp. 707–709, "Application of amplitude histograms for quality of service measurements of optical channels and fault identification" by K. Muller et al.

But, the first quality monitoring method which evaluates the quality by acquiring a Q value from a measured error ratio needs to generate a reference data pattern from a signal to be measured in order to detect an error, and also needs to count error bits. The second quality monitoring method which evaluates the quality by acquiring a Q value from the amplitude histogram of an eye pattern obtained by sampling requires a sampling circuit like a sampling oscillo-scope and a data processing circuit. The use of those quality monitoring methods results in an increased number of constituting components and enlarges the apparatus. Those methods also complicate the measuring algorithm.

While an error in a received signal can be measured by using error monitoring bytes $B_1$ and $B_2$ in an STM-n (Synchronous Transport Module-n) frame, this method not only requires a frame process but also a long time measure the signal quality when the error ratio is very small.

BRIEF SUMMARY OF THE INVENTION

Accordingly, it is an object of the present invention to provide a digital-signal quality monitoring method which can easily and accurately monitor the quality of received digital signals, and a communications apparatus which uses this method.

To achieve the above object, a digital-signal quality monitoring method according to this invention is designed as follows.

(1) A digital-signal quality monitoring method comprising the steps of scanning a discrimination level while discriminating a value of an input n-value digital signal (n being a natural number equal to or larger than 2) by comparing that value with the discrimination level; detecting an average value of the discriminated signal; and computing a quality parameter from the average value.

(2) A digital-signal quality monitoring method comprising the steps of scanning a discrimination level and discrimination timings while discriminating a value of an input n-value digital signal (n being a natural number equal to or larger than 2) by comparing that value with the discrimination level; detecting an average value of the discriminated signal; and computing a quality parameter from the average value.

(3) In the digital-signal quality monitoring method (1), a probability density function along an amplitude axis of the input signal is acquired by differentiating the average value of the discriminated signal with respect to the discrimination levels and the quality parameter is computed from the probability density function.

(4) In the digital-signal quality monitoring method (2), a probability density function along an amplitude axis of the input signal at individual discrimination timing is acquired by differentiating the average value of the discriminated signal with respect to the discrimination levels and the quality parameter is computed from the probability density function.

(5) In the digital-signal quality monitoring method (1), a probability density function along an amplitude axis of the input signal is acquired by scanning the discrimination levels in such a way as to be proportional to time and differentiating the average value of the discriminated signal with respect to time and the quality parameter is computed from the probability density function.

(6) In the digital-signal quality monitoring method (2), a probability density function along an amplitude axis of the input signal at individual discrimination timing is acquired by scanning the discrimination levels in such a way as to be proportional to time and differentiating the average value of the discriminated signal with respect to time and the quality parameter is computed from the probability density function.

(7) In any one of the digital-signal quality monitoring methods (3) to (6), a probability density function along an amplitude axis with no input made has been acquired in advance, and the probability density function acquired at a time a signal is input is corrected based on that former probability density function.

(8) In any one of the digital-signal quality monitoring methods (3) to (6), an n number of average values and n number of dispersion values of the discriminated signal are acquired from the probability density function and the quality parameter is computed from the probability density function.

(9) In the digital-signal quality monitoring method (4) or (6), an eye opening is computed from the probability density function along the amplitude axis of the input signal at individual discrimination timing.

The following are feasible communications apparatuses which use the digital-signal quality monitoring method of this invention.

(10) A regular-system/reserved-system switching apparatus comprising switching means for selectively outputting an n-value digital signal (n being a natural number equal to or larger than 2) of a regular system or an n-value digital signal of a reserved system; quality monitoring means for monitoring the n-value digital signal output by the switching means, thereby acquiring a quality parameter; switching control means for controlling a switching action of the switching means based on the quality parameter obtained by the quality monitoring means, whereby the quality monitoring means scans a discrimination level while discriminating a value of the n-value digital signal by comparing that value with the discrimination level, detects an average value of the discriminated signal and computes a quality parameter of the n-value digital signal from the average value.

(11) A regular-system/reserved-system switching apparatus comprising quality monitoring means for monitoring n-value (n being a natural number equal to or larger than 2) digital signals of both a regular system and a reserved system and acquiring quality parameters; switching means for selectively outputting the n-value digital signal of the regular system or the n-value digital signal of the reserved system; and switching control means for controlling a switching action of the switching means based on the quality parameters of the regular system and the reserved system obtained by the quality monitoring means, whereby the quality monitoring means scans a discrimination level while discriminating values of the n-value digital signals of both the regular system and the reserved system by comparing those values with the discrimination level, detects average values of the discriminated signals and computes quality parameters of the n-value digital signals of both the regular system and the reserved system from the average values.

(12) In the regular-system/reserved-system switching apparatus (10) or (11), the quality monitoring means scans the discrimination levels and also discrimination timings.

(13) A transmission quality monitoring apparatus for monitoring transmission qualities of n-value digital signals (n being a natural number equal to or larger than 2) in a plurality of wavelength channels, which are optically transmitted over an optical transmission line of a wavelength division multiplexing network, comprising optical branching means for branching a part of transmitted light from the optical transmission line of the wavelength division multiplexing network; digital signal extracting means for extracting digital signals of the plurality of wavelength channels from the transmitted light branched by the optical branching means; quality monitoring means for receiving the digital signals of the plurality of wavelength channels extracted by the digital signal extracting means and acquiring quality parameters of the digital signals; and check means for checking if there is an abnormality for each of the wavelength channels from the quality parameters obtained by the quality monitoring means and generating an abnormality detection signal upon detection of the abnormality, whereby the quality monitoring means scans a discrimination level while discriminating values of the n-value digital signals of the wavelength channels by comparing those values with the discrimination level, detects average values of the discriminated signals and computes quality parameters for the wavelength channels from the average values.

(14) A transmission quality monitoring apparatus for monitoring transmission qualities of n-value digital signals (n being a natural number equal to or larger than 2) in a plurality of wavelength channels, which are optically transmitted over an optical transmission line of a wavelength division multiplexing network, comprising optical branching means for branching a part of transmitted light from the optical transmission line of the wavelength division multiplexing network; digital signal extracting means for extracting digital signals of the plurality of wavelength channels from the transmitted light branched by the optical branching means; signal selecting means for selectively outputting an arbitrary one of the digital signals of the plurality of wavelength channels extracted by the digital signal extracting means; quality monitoring means for receiving the digital signal selected by the signal selecting means and acquiring a quality parameter of the digital signal; and check means for checking if there is an abnormality in the selected digital signal from the quality parameter obtained by the quality monitoring means and generating an abnormality detection signal upon detection of the abnormality, whereby the quality monitoring means scans discrimination level while discriminating a value of the digital signal selected by the signal selecting means by comparing that value with the discrimination level, detects an average value of the discriminated signal and computes a quality parameter for each of the wavelength channels from the average value.

(15) In the transmission quality monitoring apparatus (13) or (14), the quality monitoring means scans the discrimination levels and also discrimination timings.

(16) A receiving apparatus for demodulating a data signal by comparing an input n-value digital signal (n being a natural number equal to or larger than 2) with (n−1) threshold values, comprising quality monitoring means for scanning discrimination levels while discriminating a value of the input digital signal by comparing that value with the discrimination levels, detecting an average value of the discriminated signal, and computing a quality parameter from the average value; and threshold value control means for detecting (n−1) discrimination levels that optimize the quality parameter acquired by the quality monitoring means and using the (n−1) discrimination levels as the (n−1) threshold values.

(17) A receiving apparatus for demodulating a data signal by comparing an input n-value digital signal (n being a natural number equal to or larger than 2) with (n−1) threshold values, comprising quality monitoring means for scanning discrimination levels and discrimination timings while discriminating a value of the input digital signal by comparing that value with the discrimination levels, detecting an average value of the discriminated signal, and computing a quality parameter from the average value; and threshold value control means for detecting (n−1) discrimination levels that optimize the quality parameter acquired by the quality monitoring means and using the (n−1) discrimination levels as the (n−1) threshold values.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A through 1C are diagrams for explaining the principle of a quality monitoring method according to this invention;

FIG. 2 is a block diagram illustrating the structure that embodies the quality monitoring method according to this invention;

FIG. 3 is a block diagram showing the structure of a first embodiment of a quality monitoring method to which this invention is adapted;

FIG. 4 is a block diagram showing the structure of a second embodiment of the quality monitoring method to which this invention is adapted;

FIGS. 5A through 5C are diagrams exemplifying signals at individual sections in the second embodiment;

FIG. 8 is a block diagram showing the structure of a fifth embodiment of the quality monitoring method to which this invention is adapted;

FIG. 9 is a block diagram showing the structure of a sixth embodiment of the quality monitoring method to which this invention is adapted;

FIG. 10 is a block diagram illustrating the structure of a regular-system/reserved-system switching apparatus to which the quality monitoring method according to this invention is adapted;

FIG. 11 is a block diagram illustrating another structure of the regular-system/reserved-system switching apparatus to which the quality monitoring method according to this invention is adapted;

DETAILED DESCRIPTION OF THE INVENTION

Figure 6:
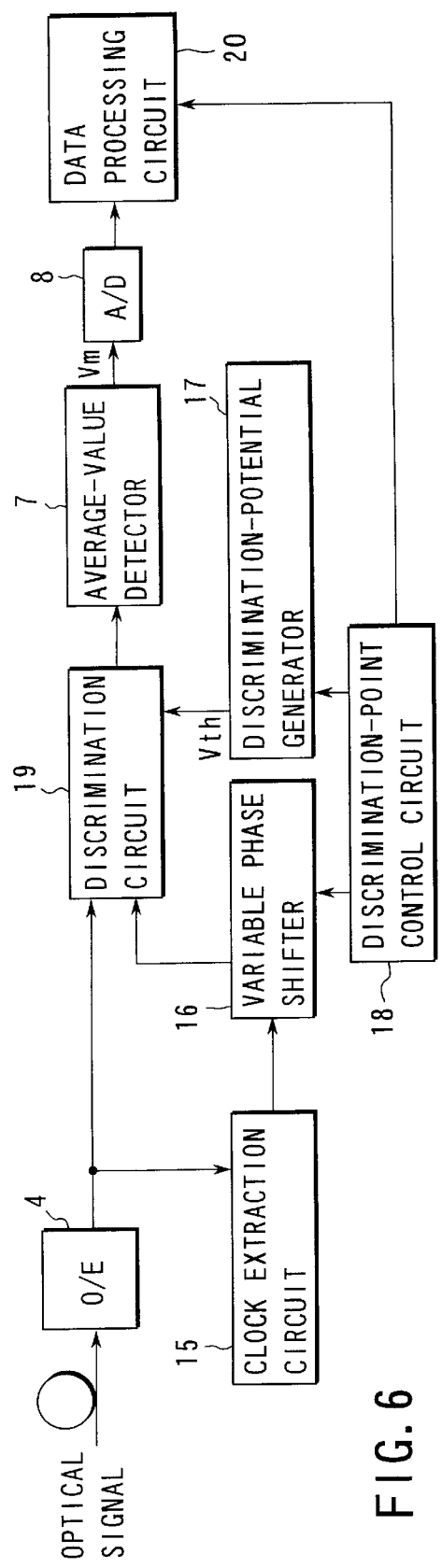
FIG. 6 is a block diagram showing the structure of a third embodiment of the quality monitoring method to which this invention is adapted.

Before the explanation of preferred embodiments of this invention, the principle of a quality monitoring method of this invention will be discussed with reference to the case where an input signal is a binary digital signal.

FIGS. 1A through 1C show the relationships between an input signal (received digital signal) and a probability density function and a distribution function. FIG. 1A shows the eye pattern of the input signal, FIG. 1B shows the probability density function f(x) which represents the probability of X=x (x is an input signal amplitude). And FIG. 1C shows the distribution function F(x) that represents the probability of X≦x. The following equations are satisfied.

$$F(x) = \int_{-\infty}^{x} f(u)\,du$$

$$\frac{dF(x)}{dx} = f(x)$$

FIG. 2 illustrates the structure that embodies the quality monitoring method according to this invention. The input signal is supplied to a discrimination section 1 where it is converted to a binary value based on the discrimination level x. The binary value is then averaged in an average-value detecting section 2, and the average value is differentiated by a differentiation section 3. The differentiation result is output as the result of the monitoring.

Specifically, when the amplitude X of the input signal is equal to or smaller than the discrimination level x, the discrimination section 1 discriminates the input signal as space and outputs $D_0$ as the output value. When the amplitude X of the input signal is larger than the discrimination level x, the discrimination section 1 discriminates the input signal as a mark and outputs $D_1$ as the output value. Given that $P_1(x)$ is the probability of discriminating the input signal as a mark and $P_0(x)$ is the probability of discriminating the input signal as space, then $P_0(x)=F(x)$ $P_1(x)=1-F(x)$ Thus, an average value M(x) of the discrimination output that is obtained by the average-value detecting section 2 is expressed by:

$$M(x)=D_0*F(x)+D_1\cdot(1-F(x))=(D_0-D_1)\cdot F(x)+D_1.$$

Because $D_0$ and $D_1$ are known values that are determined by the processing of the discrimination section 1, the distribution function F(x) of the input signal as shown in FIG. 1C is acquired from the average value after discrimination using the following equation.

$$F(x) = \frac{M(x) - D_1}{D_0 - D_1}$$

Changing the discrimination level x and then differentiating the average value after discrimination with respect to x in the differentiation section 3 yields $$\frac{dM(x)}{dx} = (D_0 - D_1) \cdot \frac{dF(x)}{dx} = (D_0 - D_1) \cdot f(x)$$

Rearranging the above equation yields $$f(x) = \frac{1}{D_0 - D_1} \cdot \frac{dM(x)}{dx}$$

from which the probability density function f(x) of the input signal as shown in FIG. 1B is obtained.

It is apparent from the above that the distribution function F(x) of an input signal is acquired by detecting the average value of a discriminated output in the average-value detecting section 2 while scanning the discrimination level x in the discrimination section 1, and the probability density function f(x) is acquired by the differential process in the differentiation section 3. As the distribution function and probability density function are acquired, the average values $\mu_1$ and $\mu_0$ of, for example, the mark level and space level of the input signal and dispersion values $\sigma_1^2$ and $\sigma_0^2$ of the individual levels are computed from those functions and a Q value as a quality parameter can be acquired from those average values and dispersion values.

Preferred embodiments of this invention will be discussed below in detail with reference to FIGS. 3 to 9. The following discusses circuits as adapted to monitor a binary digital optical signal of an NRZ code according to an intensity modulation—direct detection transmission system.

First Embodiment

FIG. 3 is a block diagram showing the structure of the first embodiment of a quality monitoring method to which this invention is adapted. In FIG. 3, an optical/electrical (O/E) converter 4 which performs a linear operation converts an input binary digital optical signal to an electrical signal. This electrical signal is supplied to a discrimination circuit 5 where it is binarized based on a discrimination voltage Vth which is generated by a discrimination-voltage generator 6. The binary output of the discrimination circuit 5 is averaged by an average value detector 7 and the resultant average value, Vm, is converted to a digital signal by an A/D (Analog to Digital) converter 8. The digital signal is supplied to a data processing circuit 10. This data processing circuit 10 receives the discrimination voltage Vth that has been digitized by an A/D converter 9, acquires the characteristic of the average value Vm with respect to this discrimination voltage Vth and computes a signal quality parameter such as a Q value.

The above will be discussed more specifically. An optical signal which travels through an optical fiber is converted by the optical/electrical converter 4 to an electrical signal which is in turn supplied to the discrimination circuit 5 to be compared with the discrimination voltage Vth from the discrimination-voltage generator 6. The discrimination-voltage generator changes the discrimination voltage Vth stepwise at predetermined intervals, for example. The discrimination circuit 5 compares the discrimination voltage Vth supplied from the discrimination-voltage generator with the voltage of the input signal that has been converted to an electrical signal, and outputs such a binary signal as to be a mark voltage $V_1$ when the voltage of the input signal is greater than the discrimination voltage Vth and a space voltage $V_0$ when the voltage of the input signal is smaller than the discrimination voltage Vth. This binary signal is supplied to the average value detector 7.

The average value detector 7 detects the average value Vm of the input binary signal of the maker voltage $V_1$ and space voltage $V_0$. The acquired average value Vm is converted by the A/D converter 8 to a digital signal which is in turn supplied to the data processing circuit 10. The discrimination voltage Vth generated by the discrimination-voltage generator 6 is converted by the A/D converter 9 to a digital signal which is then supplied to the data processing circuit 10.

The data processing circuit 10 acquires a distribution function from the input average value Vm, differentiates the distribution function with respect to a change in the discrimination voltage Vth to thereby acquire a probability density function, and computes a signal quality parameter such as a Q value from the distribution function and probability density function.

The above-described structure can accurately monitor the quality of a received digital signal with simple circuit structures which perform binarization, detection of an average value and data processing merely based on the discrimination voltage, without measuring an error ratio or measuring the amplitude histogram of an eye pattern as needed in the prior art.

Second Embodiment

FIG. 4 is a block diagram showing the structure of the second embodiment of the quality monitoring method to which this invention is adapted. Like or same reference numerals are given to those components in FIG. 4 which are the same as the corresponding components in FIG. 3, and the following discusses the differences between the first embodiment and the second embodiment.

This embodiment differs from the first embodiment shown in FIG. 3 in that a saw-tooth generator 11 provides the discrimination voltage Vth and that the output of the average value detector 7 is input to a differentiation circuit 12 and a differential output with respect to time is digitized by an A/D converter 13 before being input to a data processing circuit 14.

Referring to FIG. 4, the saw-tooth generator 11 generates the discrimination voltage Vth that changes in the form of a saw-tooth in proportion to time, and generates a timing signal for the transitional point. The discrimination voltage Vth is supplied to the discrimination circuit 5 and the timing signal for the transitional point is supplied to the data processing circuit 14. The differentiation circuit 12 outputs a signal representing the result of differentiating the output of the average value detector 7 with respect to time. This time-differential signal is converted by the A/D converter 13 to a digital signal which is then connected to the data processing circuit 14.

The contents of the processing of the data processing circuit 14 will now be discussed with reference to FIGS. 5A through 5C.

As the discrimination voltage Vth is proportional to time, the time-differential signal of the average value becomes a signal which is acquired by differentiating the average value with respect to the discrimination voltage or a signal which is proportional to the probability density function. This relationship is expressed by the following equation.

$$Vth = a \cdot t$$

where a is a constant and t is time.

$$\frac{dM}{dt} = \frac{dM}{dVth} \cdot \frac{dVth}{dt} = a \cdot \frac{dM}{dVth} = a \cdot (D_0 - D_1) \cdot f(Vth)$$

FIGS. 5A through 5C exemplify signals at the individual sections for monitoring a signal according to the second embodiment. The left-hand sides in FIGS. 5A–5C show the eye pattern of the input optical signal. As optical noise (the ASE noise of an optical fiber amplifier) is added to binary digital signal light with a mark ratio of 1/2 and a signal speed of 2.5 Gb/s and the ratio of the optical noise is increased in the order of FIG. 5A, FIG. 5B and FIG. 5C under the condition that the sum of the signal light power and the optical noise power is constant, input signals with different S/N ratios are provided. The right-hand sides in FIGS. 5A–5C show time-dependent waveforms at the individual sections when the corresponding optical signals on the left-hand sides are input. In the diagrams, the waveform Vth is the saw-tooth form of the discrimination voltage that is applied to the discrimination circuit 5. Vm is the waveform of the output voltage of the average value detector 7, which is a signal corresponding to the distribution function of the input signal. The waveform of dVm/dt is a time-differentiated waveform output from the average value detector 7, which is a signal corresponding to the probability density function of the input signal.

As the discrimination voltage has a saw-tooth form, the waveforms of the acquired Vm and dVm/dt are turned at the point where the inclination of the discrimination voltage waveform is changed.

It is apparent from the waveforms in FIGS. 5A–5C that as the ratio of noise in the input optical signal increases, the difference between two peaks (equivalent to the average values of the mark level and space level) in the differential signal equivalent to the probability density function becomes smaller, the widths of the profiles of the individual peaks (equivalent to dispersions of the mark and space) become wider and the heights of the peaks change. The parameter, such as a Q value, that represents the signal quality of the input light can be acquired by analyzing the waveform of the output signal of the differentiation circuit 12 in the data processing circuit 14.

Although this embodiment is provided with the differentiation circuit 12 so that the time-differentiated signal is input to the data processing circuit 14, the same advantage can be acquired by inputting the average value signal directly to the data processing circuit 14 and accomplishing the time-differential process through the computation in the data processing circuit 14.

Third Embodiment

FIG. 6 is a block diagram showing the structure of the third embodiment of the quality monitoring method to which this invention is adapted. This embodiment is an improvement of the first embodiment so that the discrimination timing is scanned as well as the discrimination voltage. To avoid the redundant description, like or same reference numerals are given to those components in FIG. 6 which are the same as the corresponding components in FIG. 3.

In FIG. 6, a clock extraction circuit 15 extracts a clock signal synchronous with a data signal component from a binary digital signal from the optical/electrical converter 4 according to the non-linear extraction system or PLL system. The extracted clock signal is supplied to a variable phase shifter 16. The variable phase shifter 16 shifts the phase of the input clock signal by an amount designated by a discrimination-point control circuit 18, and sends its output to a discrimination circuit 19. The discrimination-voltage generator shown in FIG. 3, a discrimination-voltage generator 17 basically generates the discrimination voltage Vth that changes stepwise. However, the transitional point is determined by a control signal from the discrimination-point control circuit 18.

The discrimination-point control circuit 18 controls the variable phase shifter 16 and the discrimination-voltage generator 17 to control the discrimination point, and informs a data processing circuit 20 of information about the discrimination point. The discrimination circuit 19 discriminates the mark or space of the input digital signal based on the discrimination voltage at the rising of the input clock signal. The data processing circuit 20 acquires a quality parameter by performing a computation on the average value of the digitized discrimination result based on the discrimination point information.

According to the structure of this embodiment, the discrimination voltage and the discrimination phase are both scanned by executing variable control of the variable phase shifter 16 and the discrimination-voltage generator 17 using the discrimination-point control circuit 18. This makes it possible to acquire a distribution function at a predetermined timing of the input digital signal from the output of the average value detector 7. Therefore, the data processing circuit 20 acquires not only a Q value using the above-described scheme but also a quality parameter which includes information in the direction of the time axis such as the eye opening. Based on those quality parameters, it is possible to acquire the degree of a change in waveform caused by the wavelength dispersion, non-linear effect or the like of an optical fiber. This can ensure more precise quality monitoring.

Fourth Embodiment

Figure 7:
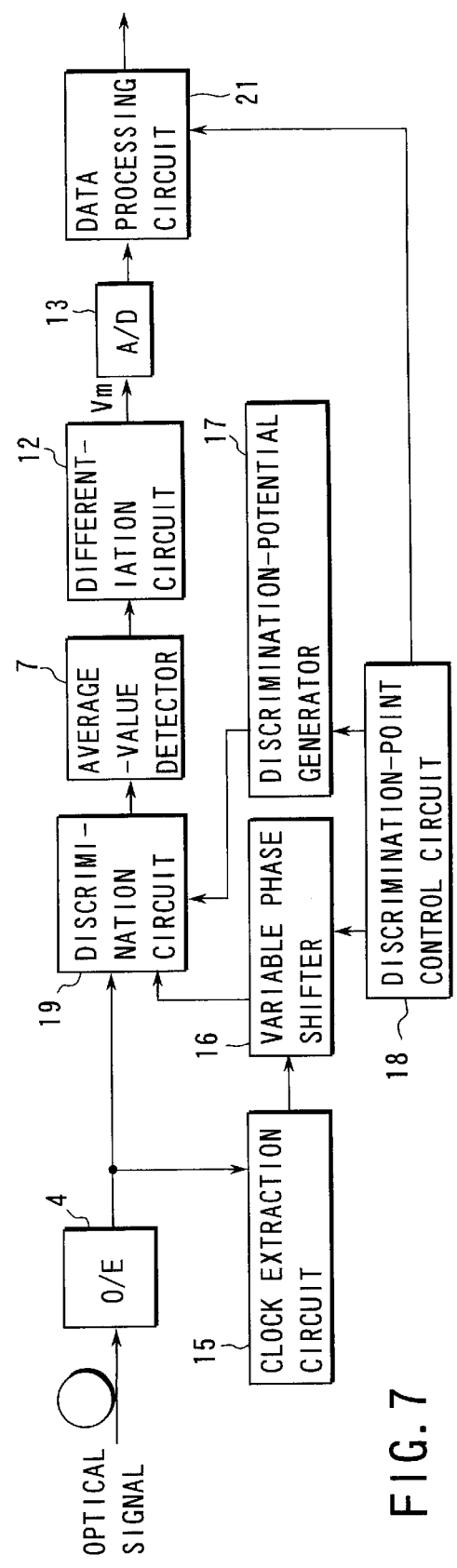
FIG. 7 is a block diagram showing the structure of a fourth embodiment of the quality monitoring method to which this invention is adapted.

FIG. 7 is a block diagram showing the structure of the fourth embodiment of the quality monitoring method to which this invention is adapted. This embodiment is the second embodiment to which the same improvement as given by the third embodiment is made, so that the discrimination timing is scanned as well as the discrimination voltage. To avoid the redundant description, like or same reference numerals are given to those components in FIG. 7 which are the same as the corresponding components in FIGS. 4 and 6.

According to the structure of this embodiment too, the discrimination voltage and the discrimination phase are both scanned by executing variable control of the variable phase shifter 16 and the discrimination-voltage generator 17 using the discrimination-point control circuit 18. This makes it possible to acquire a distribution function at a predetermined timing of the input digital signal from the output of the average value detector 7. Therefore, a data processing circuit 21 acquires not only a Q value using the above-described scheme but also a quality parameter which includes information in the direction of the time axis such as the eye opening. Based on those quality parameters, it is possible to acquire the degree of a change in waveform caused by the wavelength dispersion, non-linear effect or the like of an optical fiber. This can ensure more precise quality monitoring.

Fifth Embodiment

FIG. 8 is a block diagram showing the structure of the fifth embodiment of the quality monitoring method to which this invention is adapted. This embodiment is a further improvement made to the third embodiment to add the structure that compensates for noise generated by a monitor system. To avoid the redundant description, like or same reference numerals are given to those components in FIG. 8 which are the same as the corresponding components in FIG. 6.

To begin with, the principle of a method of compensating for noise generated by a monitor system will be explained using some equations. It is assumed in the following description that the probability density functions of the noise of the monitor system and the mark level and space level of an input signal are Gaussian functions.

The probability density function f(x) at the discrimination timing of the input signal is expressed by the following equation.

$$f(x) = \frac{M}{\sigma_1 \cdot \sqrt{2\pi}} \cdot \exp\left\{-\frac{(x-\mu_1)^2}{2\sigma_1^2}\right\} + \frac{M-1}{\sigma_0 \cdot \sqrt{2\pi}} \cdot \exp\left\{-\frac{(x-\mu_0)^2}{2\sigma_0^2}\right\}$$

where M is the mark ratio, $\mu_1$ and $\mu_0$ are the average values of the mark level and space level respectively and $\sigma_1^2$ and $\sigma_0^2$ are the dispersion values of the mark level and space level respectively.

The probability density function f'(x) that is acquired by using this invention includes noise of the monitor system. Due to the influence of the noise generated by the monitor system, the average values of the mark level and space level do not change but the dispersion value becomes the sum of the dispersion value of the original signal and the dispersion value of the noise of the monitor system, so that f'(x) is given by the following equation.

$$f'(x) = \frac{M}{\sqrt{(\sigma_1^2 + \sigma_n^2)} \cdot \sqrt{2\pi}} \cdot \exp\left\{-\frac{(x-\mu_1)^2}{2(\sigma_1^2 + \sigma_n^2)}\right\} + \frac{M-1}{\sqrt{(\sigma_0^2 + \sigma_n^2)} \cdot \sqrt{2\pi}} \cdot \exp\left\{-\frac{(x-\mu_0)^2}{2(\sigma_0^2 + \sigma_n^2)}\right\}$$

where $\sigma_n^2$ is the dispersion value of the noise of the monitor system.

From the above equation, the dispersion of the original signal can be acquired by obtaining, in advance, the dispersion of the noise of the monitor system with no input made and obtaining the difference between this dispersion and the dispersion that is acquired from the probability density function which is obtained when a signal input is made.

This embodiment will now be discussed specifically referring to FIG. 8. In FIG. 8, an optical switch (SW) 22 selectively provides an output port $P_3$ with one of signals input to input ports $P_1$ and $P_2$. While an optical signal or a signal to be monitored is input to the input port $P_1$, no input is made to the input port $P_2$. This optical switch 22 is actuated by an optical-switch driving circuit 23. A control circuit 24, like the discrimination-point control circuit 18 of the third embodiment shown in FIG. 6, scans the discrimination phase and the discrimination voltage with respect to the variable phase shifter 16 and the discrimination-voltage generator 17. The control circuit 24 further controls the switching of the optical switch 22 via the optical-switch driving circuit 23 and informs a data processing circuit 25 of information about the switching of the optical switch 22 and information about the discrimination point.

A description will now be given of control procedures of the control circuit 24 and the contents of data processing in each control step.

First, the optical switch 22 is switched to the $P_2$ side to scan the discrimination voltage. The data processing circuit 25 acquires a distribution function and probability density function from the average values of the mark and space levels. At this time, scanning of a variable phase shifter 16 is not carried out because the noise of the monitor system does not depend on the discrimination timing. The data processing circuit 25 computes the dispersion of the noise generated by the monitor system from the acquired probability density function and records the dispersion.

Next, the optical switch 22 is switched to the $P_1$ side to scan both the discrimination voltage and discrimination phase. At this time, the data processing circuit 25 acquires a distribution function and probability density function at a predetermined timing of the input signal and acquires the average value and dispersion value of the mark and space of the input signal from the acquired probability density function. Then, the true dispersion of the input signal is computed by calculating the difference between the acquired dispersion value and the dispersion value of the noise of the monitor system that has been obtained in advance. A quality parameter such as a Q value or an eye opening is computed from those obtained average value and dispersion value.

As the structure of this embodiment can compensate for noise of the monitor system, therefore, it can monitor the quality of the input signal more precisely.

Sixth Embodiment

FIG. 9 is a block diagram showing the structure of the sixth embodiment of the quality monitoring method to which this invention is adapted. This embodiment is the fourth embodiment to which the same improvement as given to the fifth embodiment is made to add the structure that compensates for noise generated by a monitor system. To avoid the redundant description, like or same reference numerals are given to those components in FIG. 9 which are the same as the corresponding components in FIGS. 7 and 8.

A description will now be given of control procedures of the control circuit 24 in FIG. 9 and the contents of data processing in each control step.

First, the optical switch 22 is switched to the $P_2$ side to scan the discrimination voltage. A data processing circuit 26 acquires a distribution function and probability density function from the results of the time-differentiation of the average values of the mark and space levels. At this time, scanning of a variable phase shifter 16 is not carried out because the noise of the monitor system does not depend on the discrimination timing. The data processing circuit 26 computes the dispersion of the noise generated by the monitor system from the acquired probability density function and records the dispersion.

Next, the optical switch 22 is switched to the $P_1$ side to scan both the discrimination voltage and discrimination phase. At this time, the data processing circuit 26 acquires a probability density function at a predetermined timing of the input signal and acquires the average value and dispersion value of the mark and space of the input signal from the acquired probability density function. Then, the true dispersion of the input signal is computed by calculating the difference between the acquired dispersion value and the dispersion value of the noise of the monitor system that has been obtained in advance. A quality parameter such as a Q value or an eye opening is computed from those obtained average value and dispersion value.

As the structure of this embodiment can compensate for noise of the monitor system, therefore, it can monitor the quality of the input signal more precisely.

Application Examples

Because the monitor circuits of this invention based on the above-described embodiments can ensure highly-accurate monitoring with a simple structure, they when used in the following apparatuses can demonstrate the effects.

FIG. 10 is a block diagram illustrating the structure of a regular-system/reserved-system switching apparatus to which the quality monitoring method according to this invention is adapted. In FIG. 10, signal light which is transmitted through a regular-system optical fiber 101 or a reserved-system optical fiber 102 is selectively sent to an output optical fiber 104 by an optical switch 103. An optical coupler 105 is connected to this output optical fiber 104, so that the transmitted light is branched to be input to a quality monitoring circuit 106 according to this invention. This quality monitoring circuit 106, which can take the structure of each of the above-described embodiments, obtains a quality parameter such as a Q value. A switching control circuit 107 controls the actuation of the optical switch 103. The switching control circuit 107 normally sets the optical switch 103 to the regular system side but sets the optical switch 103 to the reserved system side when the quality parameter obtained by the quality monitoring circuit 106 is lower than a specified value.

This structure does not require demodulation of signal light in the quality monitoring circuit 106, so that when this switching apparatus is incorporated into, for example, a relay apparatus, every stage can be constructed by an optical device.

FIG. 11 is a block diagram illustrating another structure of the regular-system/reserved-system switching apparatus to which the quality monitoring method according to this invention is adapted. To avoid the redundant description, like or same reference numerals are given to those components in FIG. 11 which are the same as the corresponding components in FIG. 10.

In the regular-system/reserved-system switching apparatus shown in FIG. 11, optical couplers 105a and 105b are respectively connected to the regular-system optical fiber 101 and the reserved-system optical fiber 102, transmission lights of the regular system and the reserved system, which are branched by the respective optical couplers 105a and 105b are respectively sent to quality monitoring circuits 106a and 106b to acquire quality parameters such as Q values. The quality parameters obtained by the quality monitoring circuits 106a and 106b are sent to the switching control circuit 107 which controls the switching of the optical switch 103 in accordance with the quality results.

This structure, like the apparatus shown in FIG. 10, requires no demodulation of signal light in the quality monitoring circuits 106a and 106b, so that when this switching apparatus is incorporated into, for example, a relay apparatus, every stage can be constructed by an optical device. Further, while the apparatus shown in FIG. 10 takes a feedback control structure, the apparatus shown in FIG. 11 takes a feed-forward control structure and can therefore enhance the response characteristic of the switching control.

Figure 12:
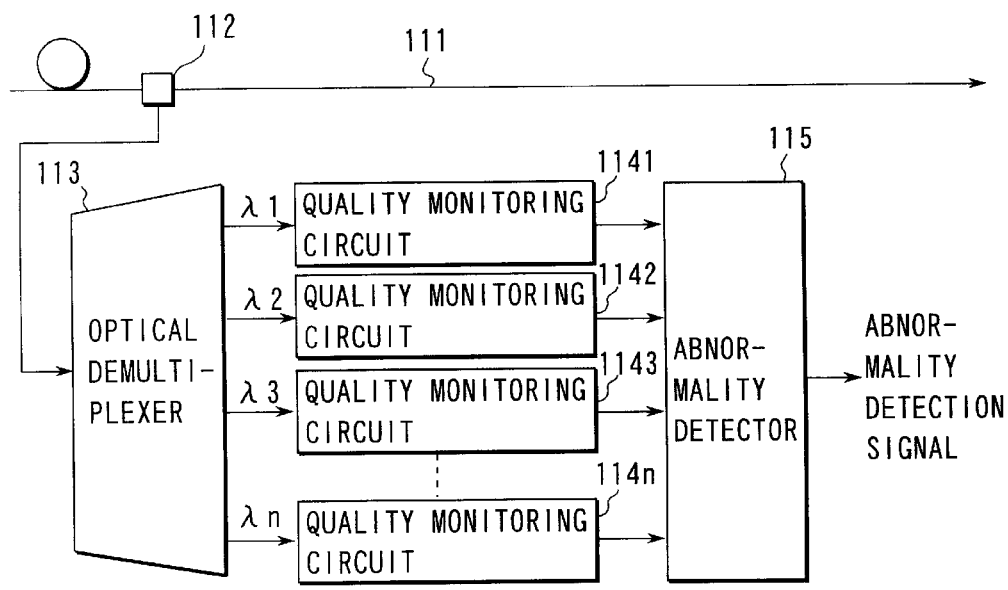
FIG. 12 is a block diagram depicting the structure of a transmission quality monitoring apparatus in a WDM network to which the quality monitoring method according to this invention is adapted.

FIG. 12 is a block diagram depicting the structure of a transmission quality monitoring apparatus in a WDM network to which the quality monitoring method according to this invention is adapted. In FIG. 12, multi-wavelength signal light (the number of wavelength channels is n) having a different transmission speed, transmission frame format and modulation system for each wavelength channel is transmitted over an optical fiber 111, the main line.

A transmission quality monitoring apparatus is constructed as follows with respect to this optical fiber 111. An optical coupler 112 is connected to the optical fiber 111 at a predetermined location to branch traveling multi-wavelength signal light and the branched signal light is demultiplexed for the individual wavelength channels by an optical demultiplexer 113. The individual demultiplexed outputs are sent to quality monitoring circuits 114l to 114n according to this invention which are provided in association with the demultiplexed outputs and which individually acquire quality parameters. An abnormality detector 115 compares the quality parameters obtained by the quality monitoring circuits 114l–114n with a specific value, and generates an abnormality detection signal to inform a supervisor of an abnormal quality or instructs the switching of the abnormal system to a reserved system if any, when there is a wavelength channel whose quality parameter is smaller than the specific value.

With the above-described structure, the structure of the quality monitoring circuit is very simple as compared with that of the prior art and can be made compact. Even if a large number of quality monitoring circuits are needed in association of multiple wavelength channels, therefore, the overall scale of the apparatus can be made smaller. Further, as the individual quality monitoring circuits are not affected by the transmission speed, the transmission frame format and the modulation system, they can take the same structure, so that cost reduction can be expected through mass-production.

Figure 13:
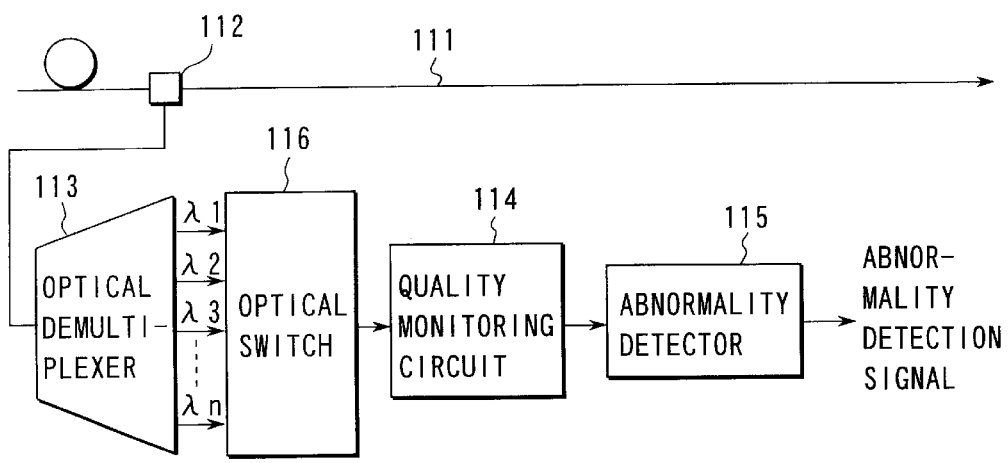
FIG. 13 is a block diagram depicting another structure of the transmission quality monitoring apparatus in a WDM network to which the quality monitoring method according to this invention is adapted.

FIG. 13 is a block diagram depicting another structure of the transmission quality monitoring apparatus in a WDM network to which the quality monitoring method according to this invention is adapted. To avoid the redundant description, like or same reference numerals are given to those components in FIG. 13 which are the same as the corresponding components in FIG. 12.

In the transmission quality monitoring apparatus shown in FIG. 13, transmitted lights $\lambda_1$ to $\lambda_n$ branched for the individual wavelength channels by the optical demultiplexer 113 are selectively scanned in order by an optical switch 116, quality parameters are sequentially acquired for the selected outputs by a single quality monitoring circuit 114 and the abnormality detector 115 monitors the quality of the transmitted light of each wavelength channel.

This structure can allow a single quality monitoring circuit to cope with all the wavelength channels and can thus require fewer constituting circuits than the apparatus shown in FIG. 12.

Figure 14:
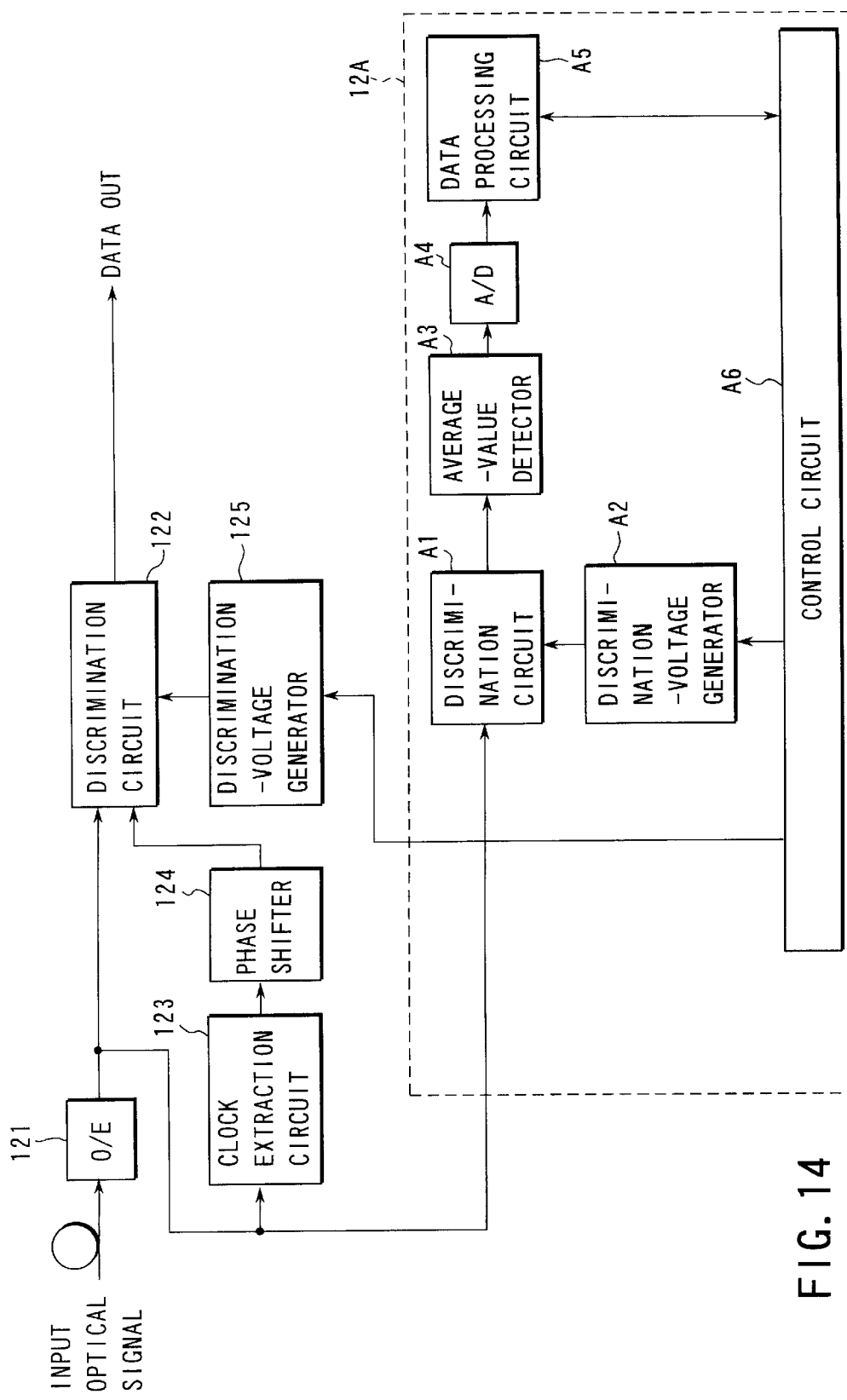
FIG. 14 is a block diagram showing the structure of an optical receiving apparatus to which the quality monitoring method according to this invention is adapted.

FIG. 14 is a block diagram showing the structure of an optical receiving apparatus to which the quality monitoring method according to this invention is adapted. In FIG. 14, an input optical signal is a binary digital optical signal which is converted to an electrical signal by an optical/electrical (O/E) converter 121. This electrical signal is supplied to a discrimination circuit 122 and at the same time to a clock extraction circuit 123 to extract a clock signal. This clock signal is phase-adjusted by a phase shifter 124 and the resultant signal is supplied to the discrimination circuit 122. This discrimination circuit 122 demodulates a data signal by discriminating the value of the input digital signal at the timing of the clock signal, and uses the discrimination voltage from a discrimination-voltage generator 125 in the discrimination process.

The output of the optical/electrical converter 121 is also supplied to a discrimination circuit A1 of a quality monitoring circuit 12A. This discrimination circuit A1 discriminates a mark level and space level of the output of the converter 121 by using, as the discrimination level, the discrimination voltage that is generated by a discrimination-voltage generator A2. The results of discriminating the mark level and space level are averaged by an average value detector A3, and digitized by an A/D converter A4. The digital values are then supplied to a data processing circuit A5.

This data processing circuit A5 receives the output of the average value detector A3, acquires the characteristic of the average value with respect to the discrimination voltage value, and computes a signal quality parameter such as a Q value. A control section A6 performs variable control of the voltage generated by the discrimination-voltage generator A2 in a stepwise manner, receives quality parameters for the respective discrimination voltages from the data processing circuit A5, acquires the discrimination voltage value that provides the optimal quality parameter, and sets the voltage generated by the discrimination-voltage generator 125 of the demodulation system to that voltage value.

The above-described structure can automatically set the voltage value for discriminating data to the optimal level in accordance with the quality of the input signal.

Figure 15:
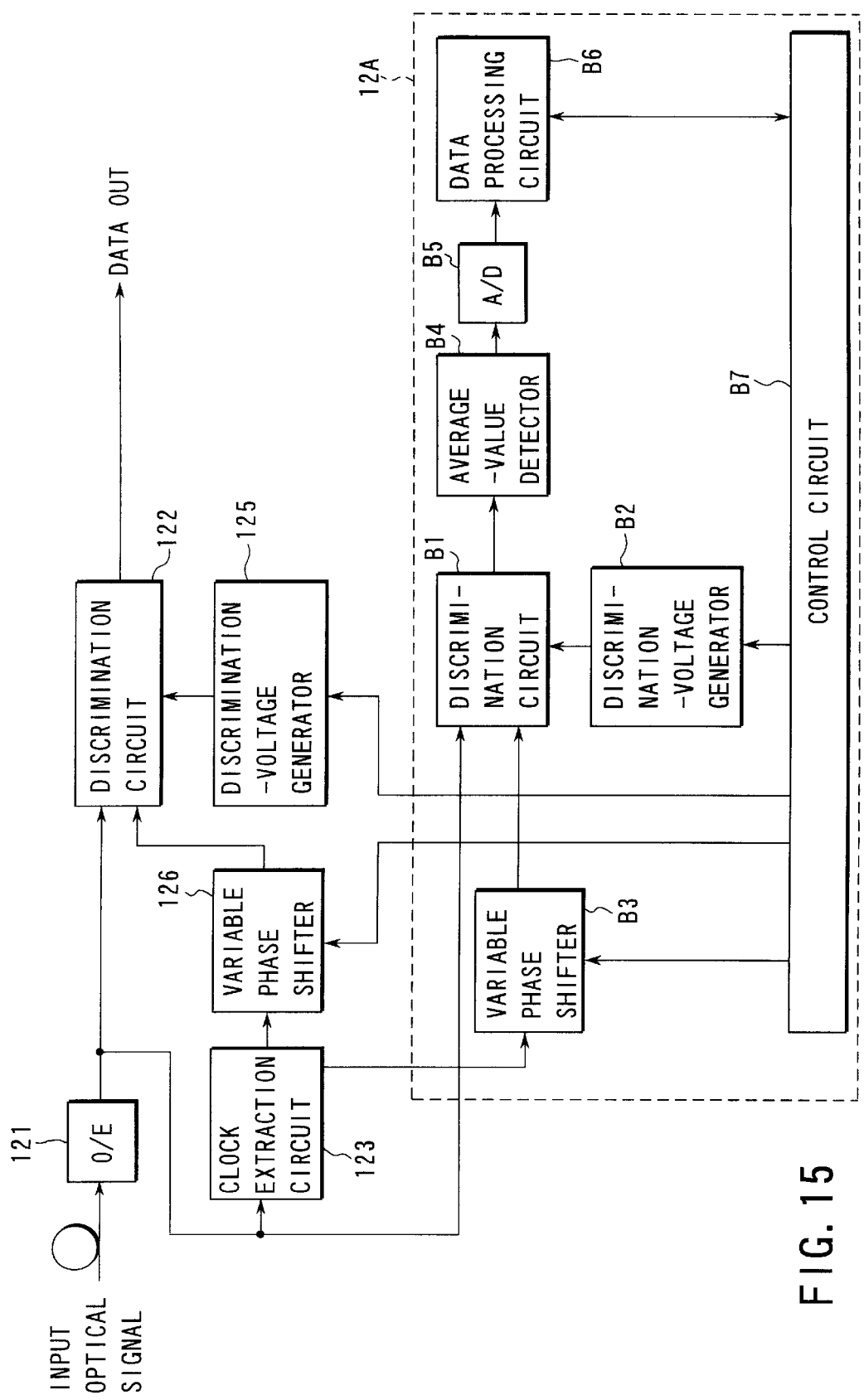
FIG. 15 is a block diagram showing another structure of an optical receiving apparatus to which the quality monitoring method according to this invention is adapted.

FIG. 15 is a block diagram showing another structure of the optical receiving apparatus to which the quality monitoring method according to this invention is adapted. Like or same reference numerals are given to those components in FIG. 15 which are the same as the corresponding components in FIG. 14. In FIG. 15, an input optical signal is a binary digital optical signal which is converted to an electrical signal by the optical/electrical converter 121. This electrical signal is supplied to the discrimination circuit 122 and at the same time to the clock extraction circuit 123 to extract a clock signal. This clock signal is phase-adjusted by a variable phase shifter 126 and the resultant signal is supplied to the discrimination circuit 122. This discrimination circuit 122 demodulates a data signal by discriminating the value of the input digital signal at the timing of the clock signal, and uses the discrimination voltage from a discrimination-voltage generator 125 in the discrimination process.

The output of the optical/electrical converter 121 is also supplied to a discrimination circuit B1 of a quality monitoring circuit 12B. The clock signal extracted by the clock extraction circuit 123 is supplied to a variable phase shifter B3 of a quality monitoring circuit 12B. This variable phase shifter B3 shifts the phase of the input clock signal by an amount specified by a control section B7, and sends its output to the discrimination circuit B1. A discrimination-voltage generator B2 generates a discrimination voltage which varies in a stepwise manner, under the control of the control section B7.

The control section B7 controls the discrimination point by controlling the variable phase shifter 16 and the discrimination-voltage generator 17 and informs a data processing circuit B6 of information about the discrimination point. The discrimination circuit B1 discriminates a mark or space of the input digital signal based on the discrimination voltage at the rising of the input clock signal. The discriminated mark level and space level are averaged by an average value detector B4, and converted to digital signals by an A/D converter B5. The digital signals are then supplied to the data processing circuit B6. This data processing circuit B6 computes a signal quality parameter such as a Q value by performing a computation on the average value of the digitized discrimination result based on information of the discrimination point.

A control section B7 performs variable control of the voltage generated by the discrimination-voltage generator B2 in a stepwise manner, scans the phase amount of the variable phase shifter B3, receives quality parameters for the respective discrimination voltages from the data processing circuit B6, acquires the discrimination voltage value and phase amount that provide the optimal quality parameter, and sets the voltage generated by the discrimination-voltage generator 125 of the demodulation system and the phase amount of the variable phase shifter 126 to the acquired voltage value and phase amount.

The above-described structure can automatically set the voltage value and phase amount for discriminating data to the optimal level in accordance with the quality of the input signal.

Although the above-described embodiments and application examples have been described with reference to the case of an optical transmission line, this invention can also be adapted to a metal transmission line. Although the above-described embodiments and application examples have been described with reference to the case where the input digital signal is a binary signal, this invention is not limited to this particular case. For an n-value digital signal which has three or more values, for example, the same advantages can be acquired by setting the number of threshold values to (n−1) and performing the processing for each of the threshold values.

In short, this invention can provide a digital-signal quality monitoring method which is capable of monitoring the quality of received digital signals easily and accurately, and a communications apparatus which uses this method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital-signal quality monitoring method comprising the steps of:
    scanning a discrimination level while discriminating a value of an input n-value digital signal (n being a natural number equal to or larger than 2) by comparing that value with said discrimination level;
    detecting an average value of said discriminated signal;
    acquiring a probability density function along an amplitude axis of said input signal by differentiating said average value of said discriminated signal with respect to said discrimination levels; and
    computing a quality parameter from said probability density function.

2. The digital-signal quality monitoring method according to claim 1, wherein said probability density function along an amplitude axis of said input signal is acquired by scanning said discrimination levels in such a way as to be proportional to time and differentiating said average value of said discriminated signal with respect to time and said quality parameter is computed from said probability density function.

3. The digital-signal quality monitoring method according to claim 1, wherein said probability density function along an amplitude axis with no input made has been acquired in advance, and said probability density function acquired at a time a signal is input is corrected based on that former probability density function.

4. The digital-signal quality monitoring method according to claim 1, wherein an n number of average values and n number of dispersion values of said discriminated signal are acquired from said probability density function and said quality parameter is computed from said probability density function.

5. A digital-signal quality monitoring method comprising the steps of:

scanning a discrimination level and discrimination timings while discriminating a value of an input n-value digital signal (n being a natural number equal to or larger than 2) by comparing that value with said discrimination level;

detecting an average value of said discriminated signal;

acquiring a probability density function along an amplitude axis of said input signal at individual discrimination timing by differentiating said average value of said discriminated signal with respect to said discrimination levels; and computing a quality parameter from said probability density function.

6. The digital-signal quality monitoring method according to claim 5, wherein said probability density function along an amplitude axis of said input signal at individual discrimination timing is acquired by scanning said discrimination levels in such a way as to be proportional to time and differentiating said average value of said discriminated signal with respect to time and said quality parameter is computed from said probability density function.

7. The digital-signal quality monitoring method according to claim 5, wherein said probability density function along an amplitude axis with no input made has been acquired in advance, and said probability density function acquired at a time a signal is input is corrected based on that former probability density function.

8. The digital-signal quality monitoring method according to claim 5, wherein an n number of average values and n number of dispersion values of said discriminated signal are acquired from said probability density function and said quality parameter is computed from said probability density function.

9. The digital-signal quality monitoring method according to claim 5, wherein an eye opening is computed from said probability density function along said amplitude axis of said input signal at individual discrimination levels.

10. A regular-system/reserved-system switching apparatus comprising:

switching means for selectively outputting an n-value digital signal (n being a natural number equal to or larger than 2) of a regular system or an n-value digital signal of a reserved system;

quality monitoring means for said n-value digital signal output by said switching means and acquiring a quality parameter;

switching control means for controlling a switching action of said switching means based on said quality parameter obtained by said quality monitoring means, whereby said quality monitoring means scans a discrimination level while discriminating a value of said n-value digital signal by comparing that value with said discrimination level, detects an average value of said discriminated signal and computes a quality parameter of said n-value digital signal from said average value.

11. The regular-system/reserved-system switching apparatus according to claim 10, wherein said quality monitoring means scans said discrimination levels and also discrimination timings.

12. A regular-system/reserved-system switching apparatus comprising:

quality monitoring means for monitoring n-value (n being a natural number equal to or larger than 2) digital signals of both a regular system and a reserved system and acquiring quality parameters;

switching means for selectively outputting said n-value digital signal of said regular system or said n-value digital signal of said reserved system; and switching control means for controlling a switching action of said switching means based on said quality parameters of said regular system and said reserved system obtained by said quality monitoring means, whereby said quality monitoring means scans a discrimination level while discriminating values of said n-value digital signals of both said regular system and said reserved system by comparing those values with said discrimination level, detects average values of said discriminated signals and computes quality parameters of said n-value digital signals of both said regular system and said reserved system from said average values.

13. The regular-system/reserved-system switching apparatus according to claim 12, wherein said quality monitoring means scans said discrimination levels and also discrimination timings.

14. A transmission quality monitoring apparatus for monitoring transmission qualities of n-value digital signals (n being a natural number equal to or larger than 2) in a plurality of wavelength channels, which are optically transmitted over an optical transmission line of a wavelength division multiplexing network, comprising:

optical branching means for branching a part of transmitted light from said optical transmission line of said wavelength division multiplexing network;

digital signal extracting means for extracting digital signals of said plurality of wavelength channels from said transmitted light branched by said optical branching means;

quality monitoring means for receiving said digital signals of said plurality of wavelength channels extracted by said digital signal extracting means and acquiring quality parameters of said digital signals; and check means for checking if there is an abnormality for each of said wavelength channels from said quality parameters obtained by said quality monitoring means and generating an abnormality detection signal upon detection of said abnormality, whereby said quality monitoring means scans a discrimination level while discriminating values of said n-value digital signals of said wavelength channels by comparing those values with said discrimination level, detects average values of said discriminated signals and computes quality parameters for said wavelength channels from said average values.

15. The transmission quality monitoring apparatus according to claim 14, wherein said quality monitoring means scans said discrimination levels and also discrimination timings.

16. A transmission quality monitoring apparatus for monitoring transmission qualities of n-value digital signals (n being a natural number equal to or larger than 2) in a plurality of wavelength channels, which are optically transmitted over an optical transmission line of a wavelength division multiplexing network, comprising:

optical branching means for branching a part of transmitted light from said optical transmission line of said wavelength division multiplexing network;

digital signal extracting means for extracting digital signals of said plurality of wavelength channels from said transmitted light branched by said optical branching means;

signal selecting means for selectively outputting an arbitrary one of said digital signals of said plurality of wavelength channels extracted by said digital signal extracting means;

quality monitoring means for receiving said digital signal selected by said signal selecting means and acquiring a quality parameter of said digital signal; and check means for checking if there is an abnormality in said selected digital signal from said quality parameter obtained by said quality monitoring means and generating an abnormality detection signal upon detection of said abnormality, whereby said quality monitoring means scans a discrimination level while discriminating a value of said digital signal selected by said signal selecting means by comparing that value with said discrimination level, detects an average value of said discriminated signal and computes a quality parameter for each of said wavelength channels from said average value.

17. The transmission quality monitoring apparatus according to claim 16, wherein said quality monitoring means scans said discrimination levels and also discrimination timings.

18. A receiving apparatus for demodulating a data signal by comparing an input n-value digital signal (n being a natural number equal to or larger than 2) with (n−1) threshold values, comprising:

quality monitoring means for scanning discrimination levels while discriminating a value of said input digital signal by comparing that value with said discrimination levels, detecting an average value of said discriminated signal, acquiring a probability density function along an amplitude axis of said input signal by differentiating said average value of said discriminated signal with respect to said discrimination levels, and computing a quality parameter from said probability density function; and threshold value control means for detecting (n−1) discrimination levels that optimize said quality parameter acquired by said quality monitoring means and using said (n−1) discrimination levels as said (n−1) threshold values.

19. A receiving apparatus for demodulating a data signal by comparing an input n-value digital signal (n being a natural number equal to or larger than 2) with (n−1) threshold values, comprising:

quality monitoring means for scanning discrimination levels and discrimination timings while discriminating a value of said input digital signal by comparing that value with said discrimination levels, detecting an average value of said discriminated signal, acquiring a probability density function along an amplitude axis of said input signal at individual discrimination timing by differentiating said average value of said discriminated signal with respect to said discrimination levels, and computing a quality parameter from said probability density function; and threshold value control means for detecting (n−1) discrimination levels that optimize said quality parameter acquired by said quality monitoring means and using said (n−1) discrimination levels as said (n−1) threshold values.

* * * * *